United States Patent [19]

Strömberg

[11] Patent Number: 5,050,897
[45] Date of Patent: Sep. 24, 1991

[54] ARRANGEMENT FOR A CLOSEABLE CARGO HOLDER OF THE CONTAINER TYPE

[76] Inventor: Gunnar Strömberg, 318 NE. 5th Ct., Apt. B, Dania, Fla. 33044

[21] Appl. No.: 457,700
[22] PCT Filed: Jul. 1, 1988
[86] PCT No.: PCT/SE88/00364
§ 371 Date: Jan. 4, 1990
§ 102(e) Date: Jan. 4, 1990
[87] PCT Pub. No.: WO89/00138
PCT Pub. Date: Jan. 12, 1989

[30] Foreign Application Priority Data
Jul. 6, 1987 [SE] Sweden ................................ 8702773

[51] Int. Cl.⁵ ........................................ B62D 21/18
[52] U.S. Cl. ................................ 280/43; 280/DIG. 8
[58] Field of Search .................... 280/43, 43.13, 43.14, 280/43.17, 43.24, 414.5, 475, DIG. 8, 43.18, 43.1; 105/215.2

[56] References Cited
U.S. PATENT DOCUMENTS

| 2,806,710 | 9/1957 | Mascaro | 280/43.24 X |
| 2,876,466 | 3/1959 | Baldwin | 280/43.17 X |
| 3,752,493 | 8/1973 | McWhorter | 280/43.24 X |
| 3,788,683 | 1/1974 | Rumell | 280/43.14 X |
| 4,008,902 | 2/1977 | Dill | 280/43.24 X |
| 4,154,352 | 5/1979 | Fowler | 280/43.17 X |
| 4,527,486 | 7/1985 | Baird et al. | 105/215.2 |

FOREIGN PATENT DOCUMENTS

| 2218072 | 10/1973 | Fed. Rep. of Germany | 280/43.24 |
| 766917 | 7/1934 | France | 280/43.17 |

Primary Examiner—Andres Kashnikow
Assistant Examiner—Brian L. Johnson
Attorney, Agent, or Firm—Lerner, David, Littenberg, Krumholz & Mentlik

[57] ABSTRACT

A closeable container-type cargo holder is designed to be stackable, one on top of another, on board ships or other transportation devices. The cargo holders are also designed to be transferred between shore and ship by lifting equipment and transported to their intended destinations on land after unloading. A set of wheels are located in the rear section of the cargo holder between the rear doors of the cargo holder and a rear loading opening. The wheels are movable between a storage position above the bottom extreme of the cargo holder and a driving position below the bottom extreme of the cargo holder. The wheels are designed to be movable between the storage position and the driving position as the cargo holder is loaded or unloaded for transport. The front of the cargo holder includes a coupling device for connecting the cargo holder to a haulage vehicle for transport over land.

15 Claims, 16 Drawing Sheets

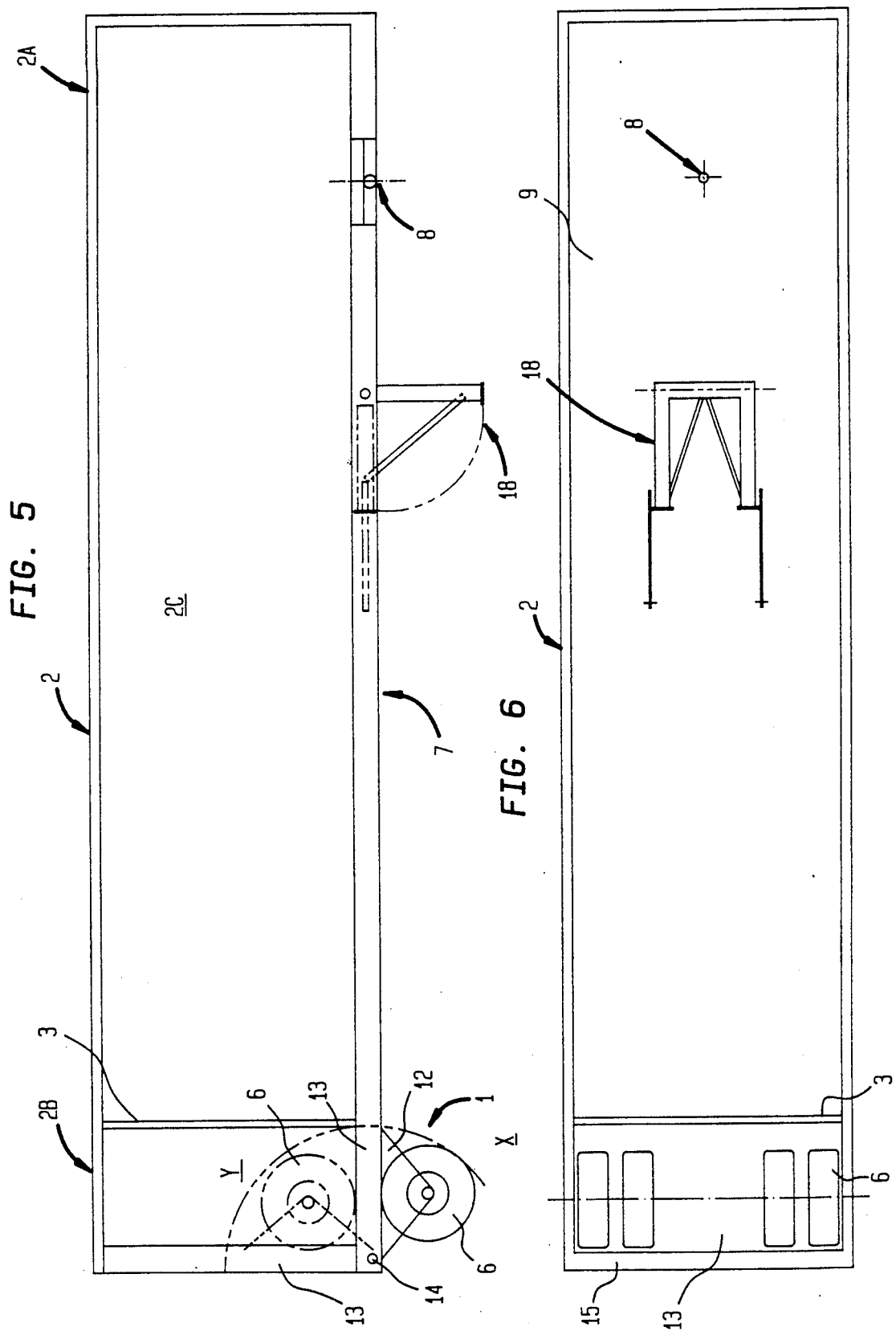

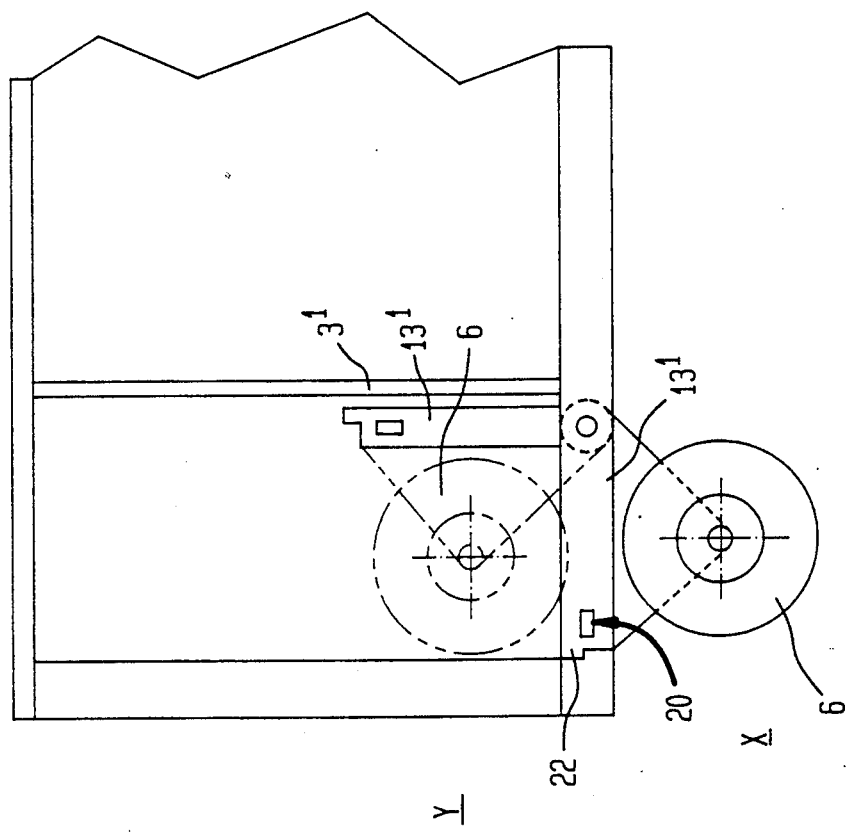

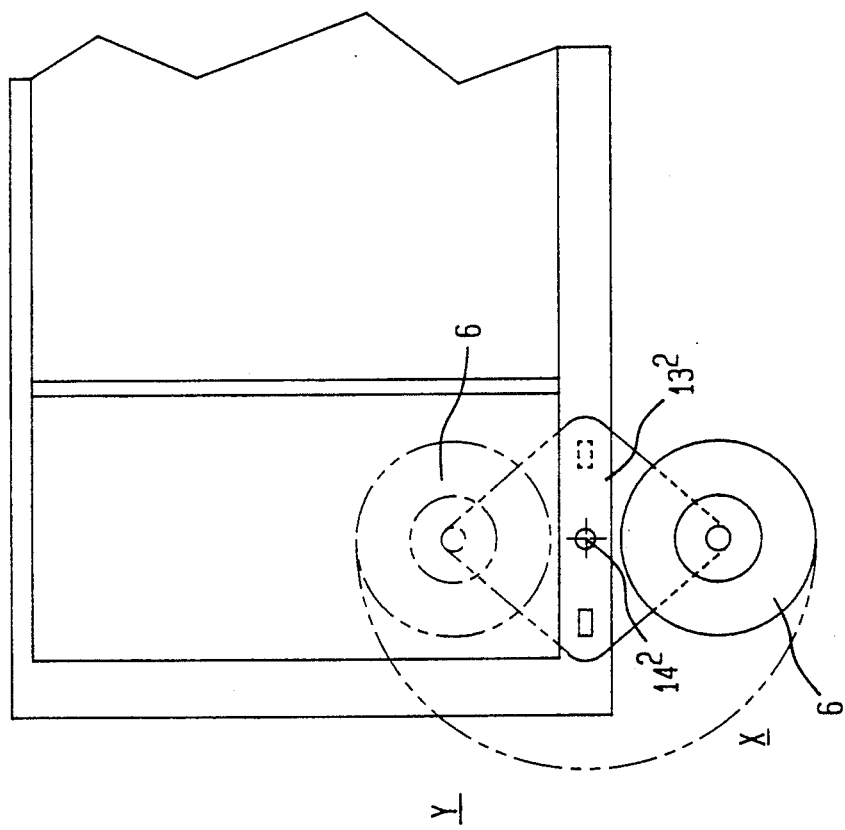
FIG. 7²

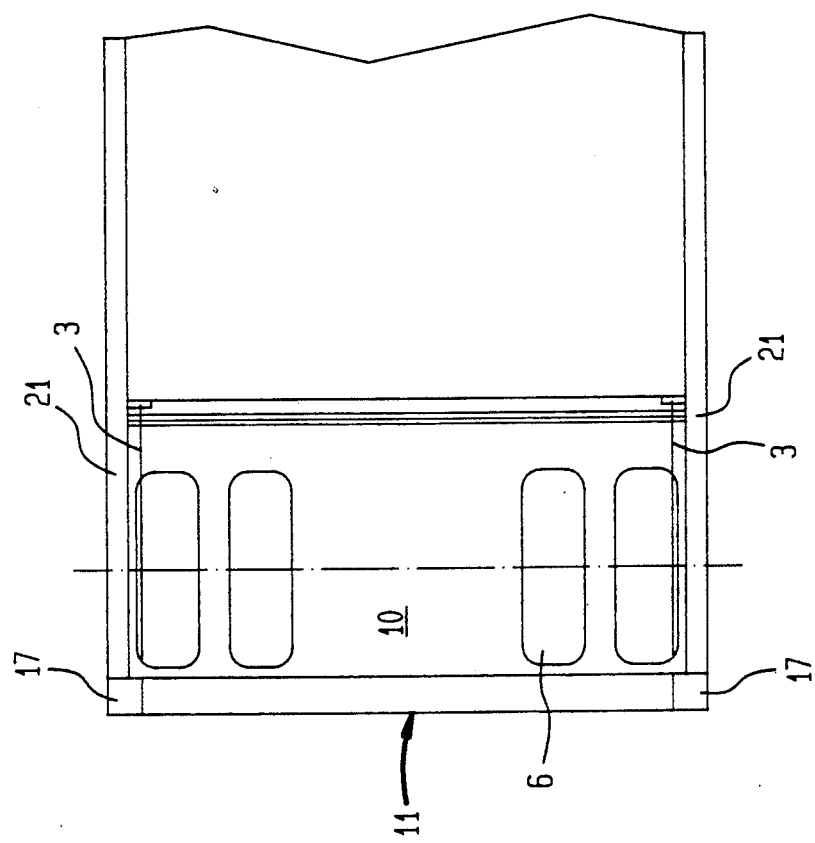

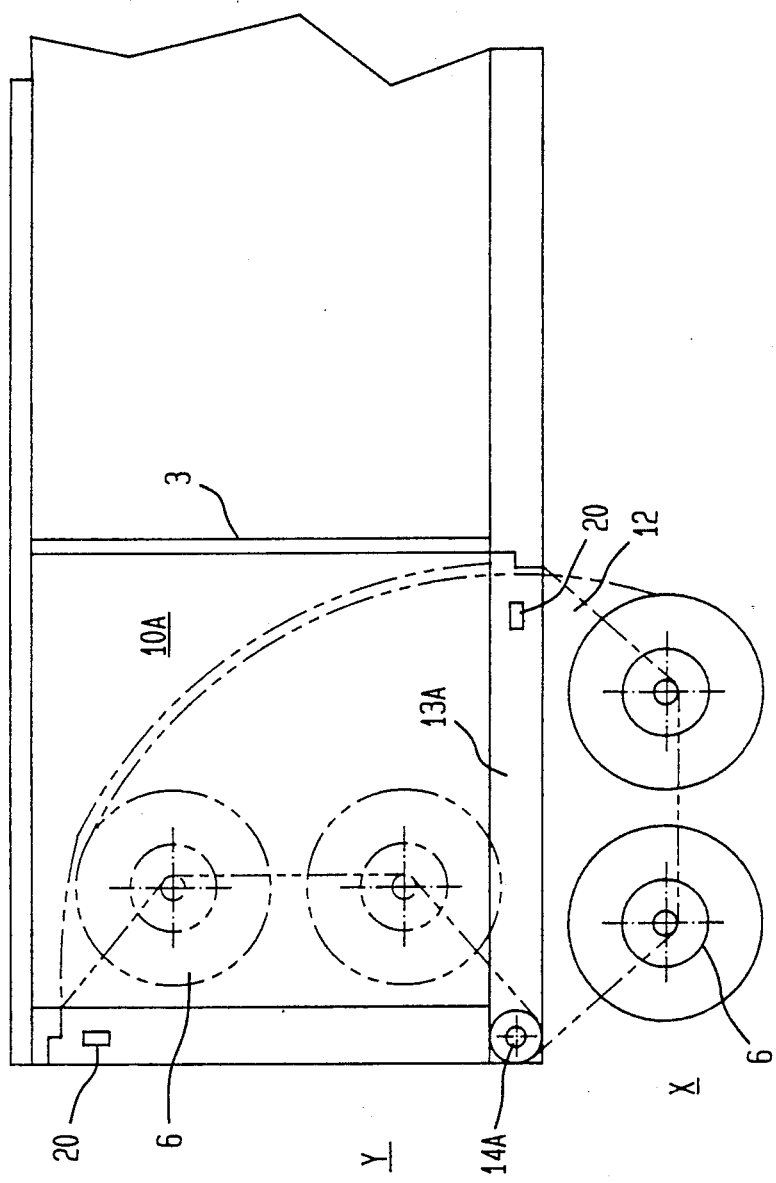

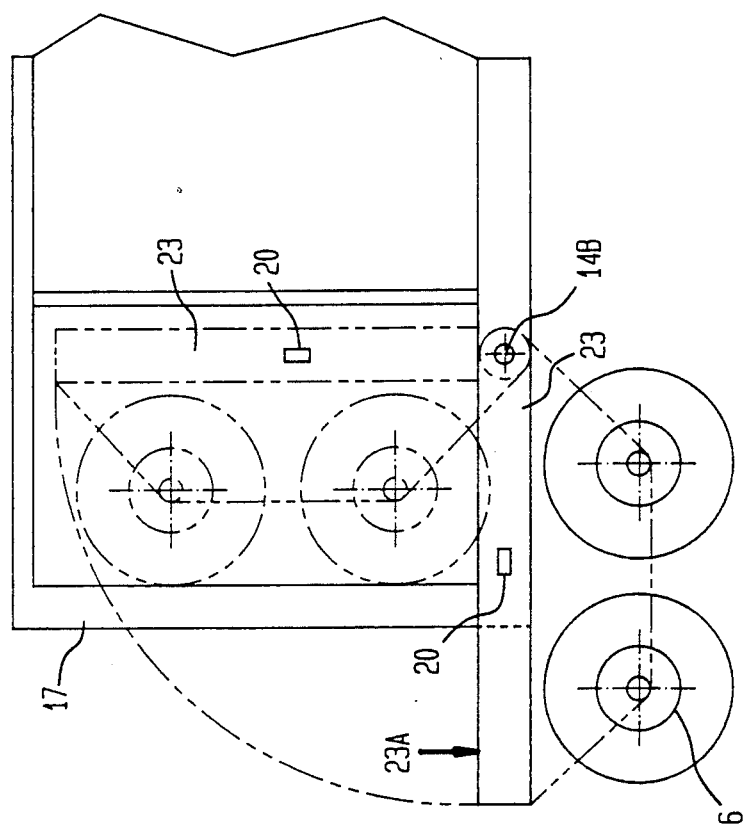
FIG. 9¹

5,050,897

ARRANGEMENT FOR A CLOSEABLE CARGO HOLDER OF THE CONTAINER TYPE

FIELD OF THE INVENTION

The present invention relates to an arrangement for a closeable cargo holder of the container type having doors located at the rear, which cargo holder is designed so as to be stacked with one cargo holder on top of another cargo holder on board ships, etc., for example, during transport, and so as to be transported to the intended destination on land after unloading and to be transferred between shore and ship by means of lifting equipment.

BACKGROUND OF THE INVENTION

Transport systems which are suitable for use on ships for door-to-door transport of cargo holders typically take one of two forms. The first form, shown in FIG. 1, is a roll-on/roll-off type of system I in which haulage vehicles transport containers $A^I$ between the shore and the cargo decks $C^I$ of ships. These containers $A^I$ are in the form of trailers having wheels $B^I$ fixed thereon and bearing against the floor thereof. The other form of transport system is a container system II which consists of closeable cargo holders $A^{II}$ which are transferred between the shore and ship by means of loading cranes which are either located on the shore or on board the ship. In this system, shown in FIG. 2, the containers are designed to be stacked one on top of the other in the cargo spaces of a ship or on deck during transport.

In most circumstances, the roll-on/roll-off system I is preferred since it permits quicker door-to-door transport of the goods in the containers $A^I$ because only haulage vehicles have to be coupled to the trailers assembled on board the ship. On the other hand, the cargo holders $A^{II}$ of the container system II have to be loaded by cranes at the receiving port onto special wheeled haulage trucks in order to be driven to the intended destination on land after unloading. The use of transport system I, however, is expensive since large dead spaces are formed between the trailers when they are loaded onto the ship. Moreover, the ships on which transport system I is used are not as quick as the larger existing container freight vessels on, for example, Atlantic crossings. Furthermore, Ro-Ro vessels have expensive and complex ventilation systems because of the exhaust fumes from the haulage vehicles, and special complex and expensive ramp systems are required for loading and unloading these vessels.

There thus exists a need for a transport system which provides the ease of loading and unloading and quick delivery associated with the roll-on/roll-off system I, but which may be stacked in close arrangement for transport on a ship.

SUMMARY OF THE INVENTION

The present invention addresses these needs by providing a stackable cargo holder including a container defining a storage space and having a front end, a rear end and a bottom; a wheel assembly arranged proximate to the rear end of the container and displaceable between a storage position above the bottom of the container whereby the bottom of the container can be stacked in contact with a supporting structure and a use position below the bottom of the container, the wheel assembly including at least two wheels; means responsive to vertical movement of the container for displacing the wheel assembly between the storage and use positions; and coupling means disposed proximate the front end of the container for releasably connecting the container to a haulage vehicle.

In preferred embodiments of the present invention the wheel assembly is pivotally displaceable between the storage position and the use position.

In more preferred embodiments, the wheel assembly further includes a wheel frame which forms an essentially horizontal floor section when pivoted to the use position and an essentially vertical wall section when pivoted to the storage position. Preferably, the horizontal floor section lies substantially coplanar with the bottom of the container.

BRIEF DESCRIPTION OF THE DRAWINGS

A more complete appreciation of the subject matter of the present invention and the various advantages thereof can be realized by reference to the following detailed description, in which reference is made to the accompanying drawings in which:

FIG. 5 is a side view of the cargo holder of FIG. 3 diagrammatically showing the wheels thereof moved to different positions;

FIG. 6 is a bottom plan view of the cargo holder of FIG. 3;

Figure 2:
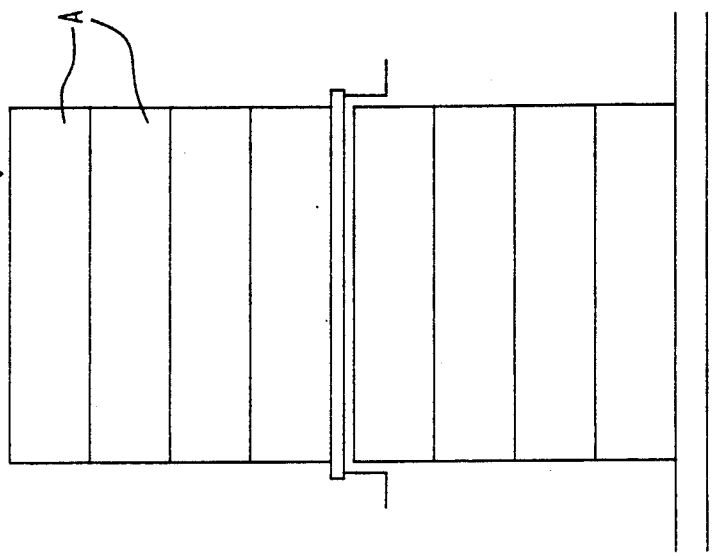
FIG. 2 is a highly schematic elevational view of a known container transport system II.
Figure 1:
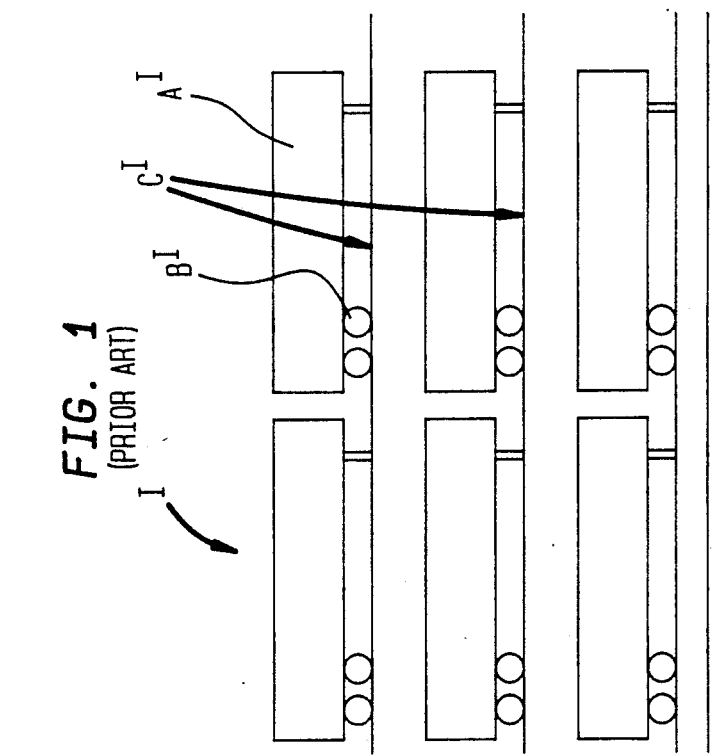
FIG. 1 is a highly schematic elevational view of a known trailer transport system I.
Figure 3:
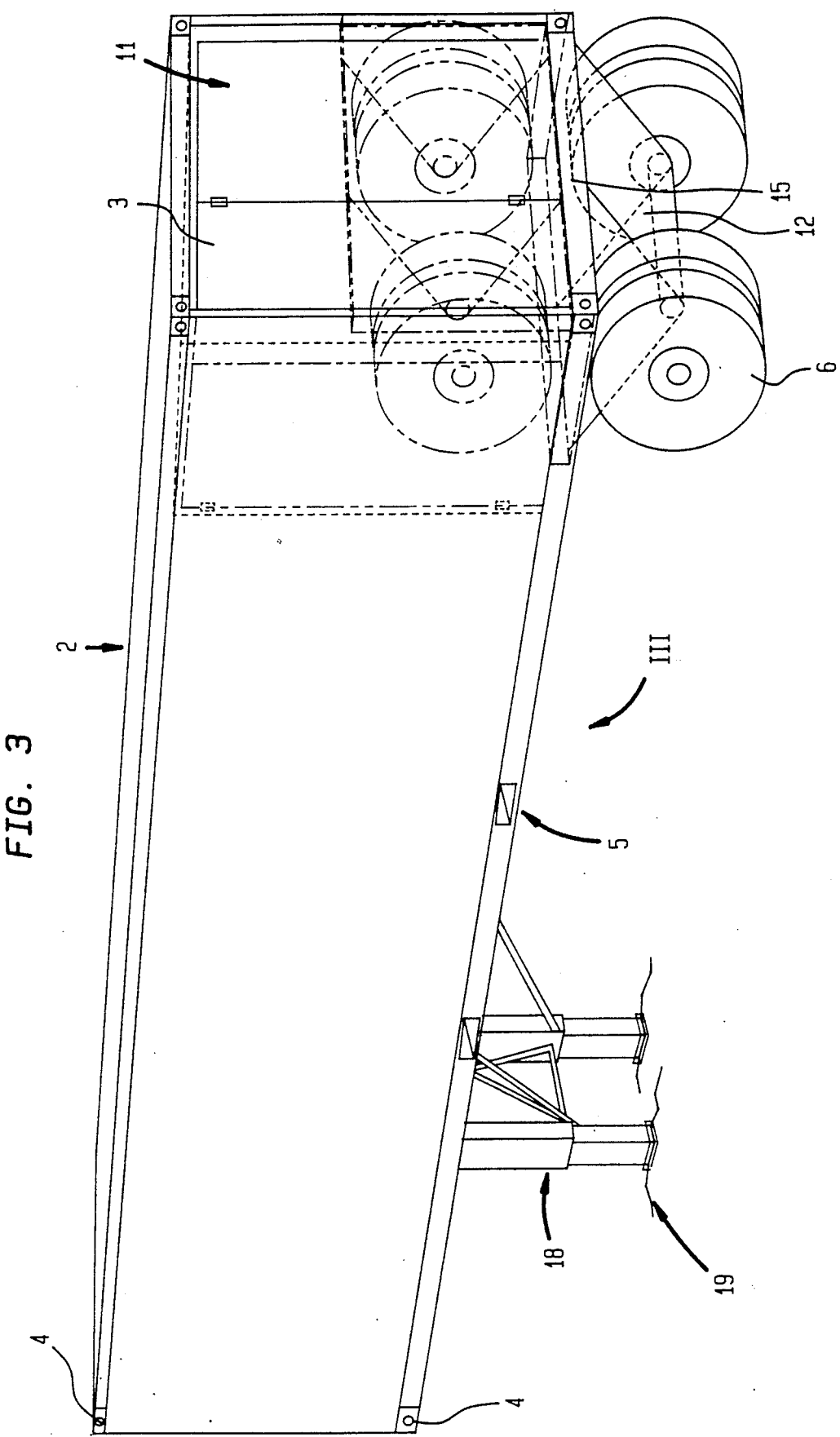
FIG. 3 is a rear perspective view of a cargo holder in accordance with the present invention.
Figure 10:
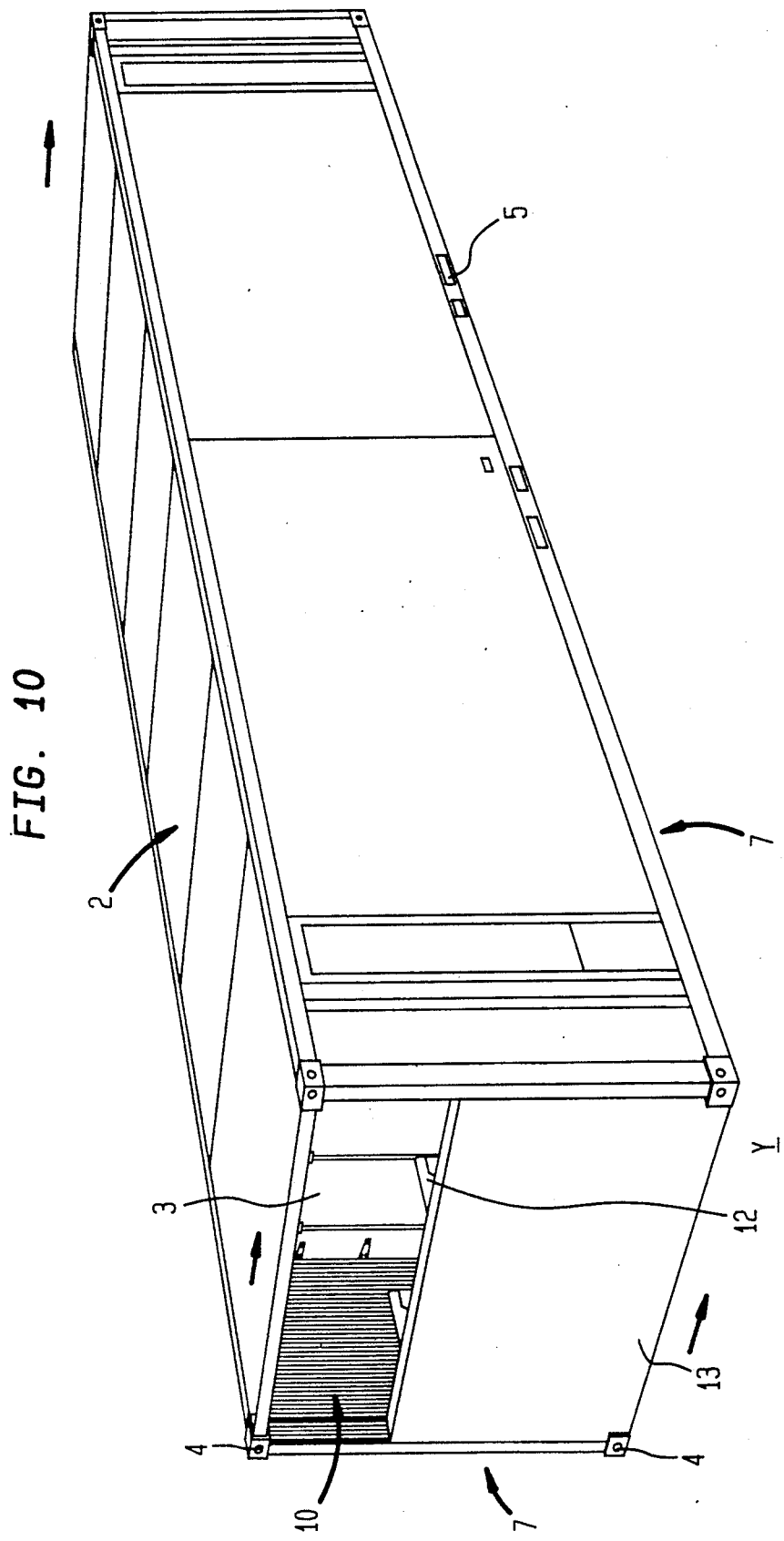
Figure 11:
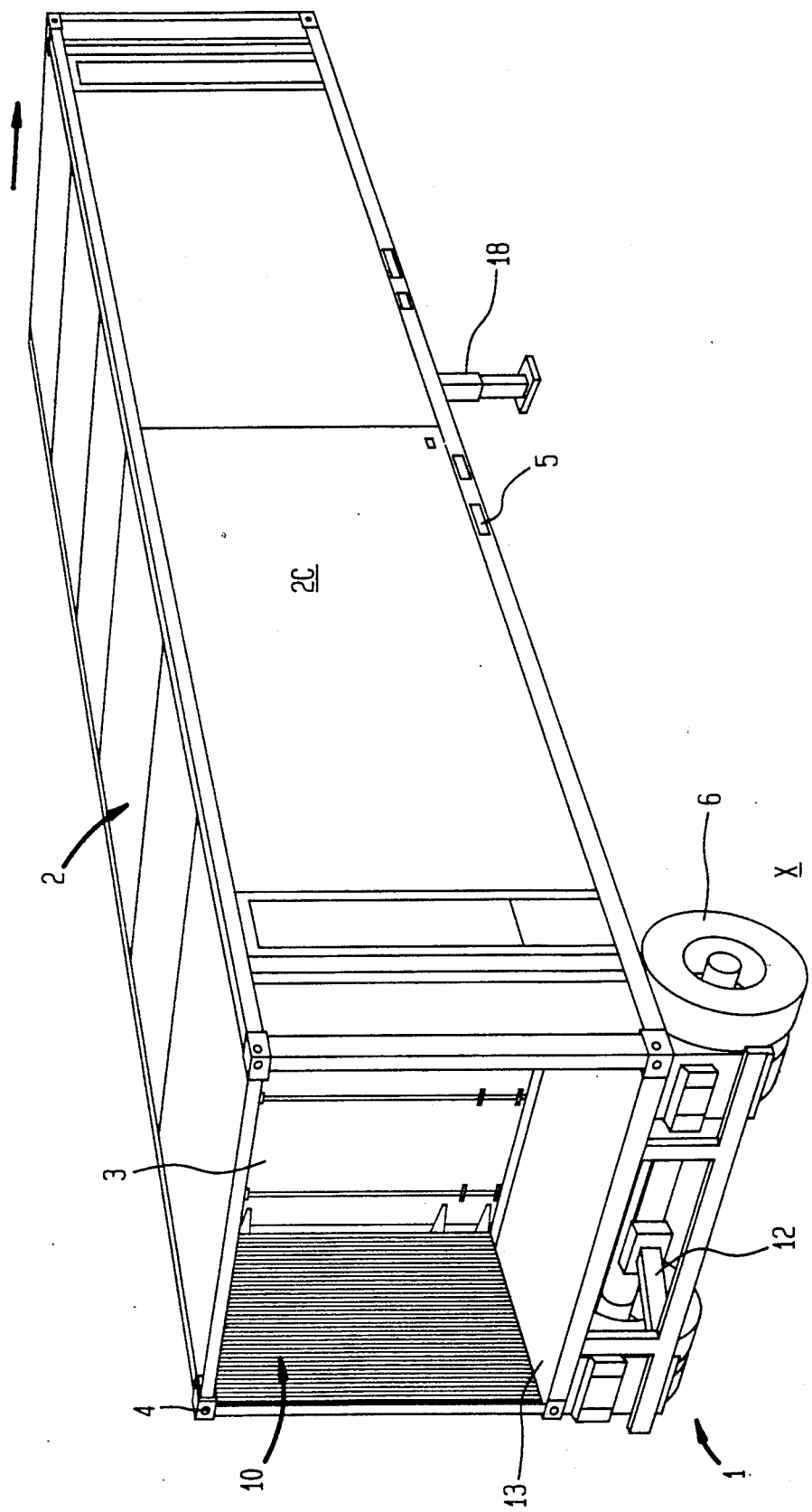
Figure 12:
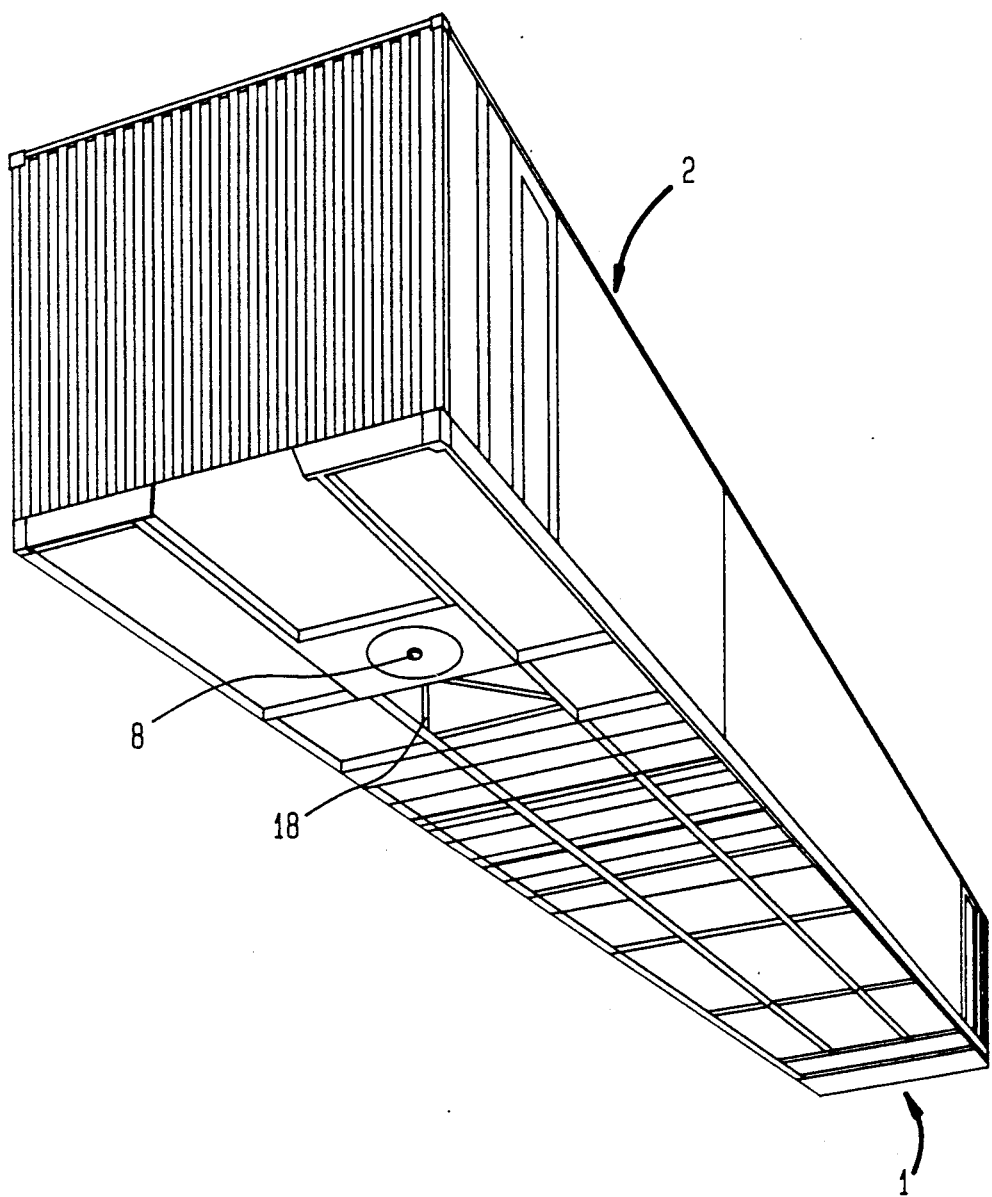
Figure 13:
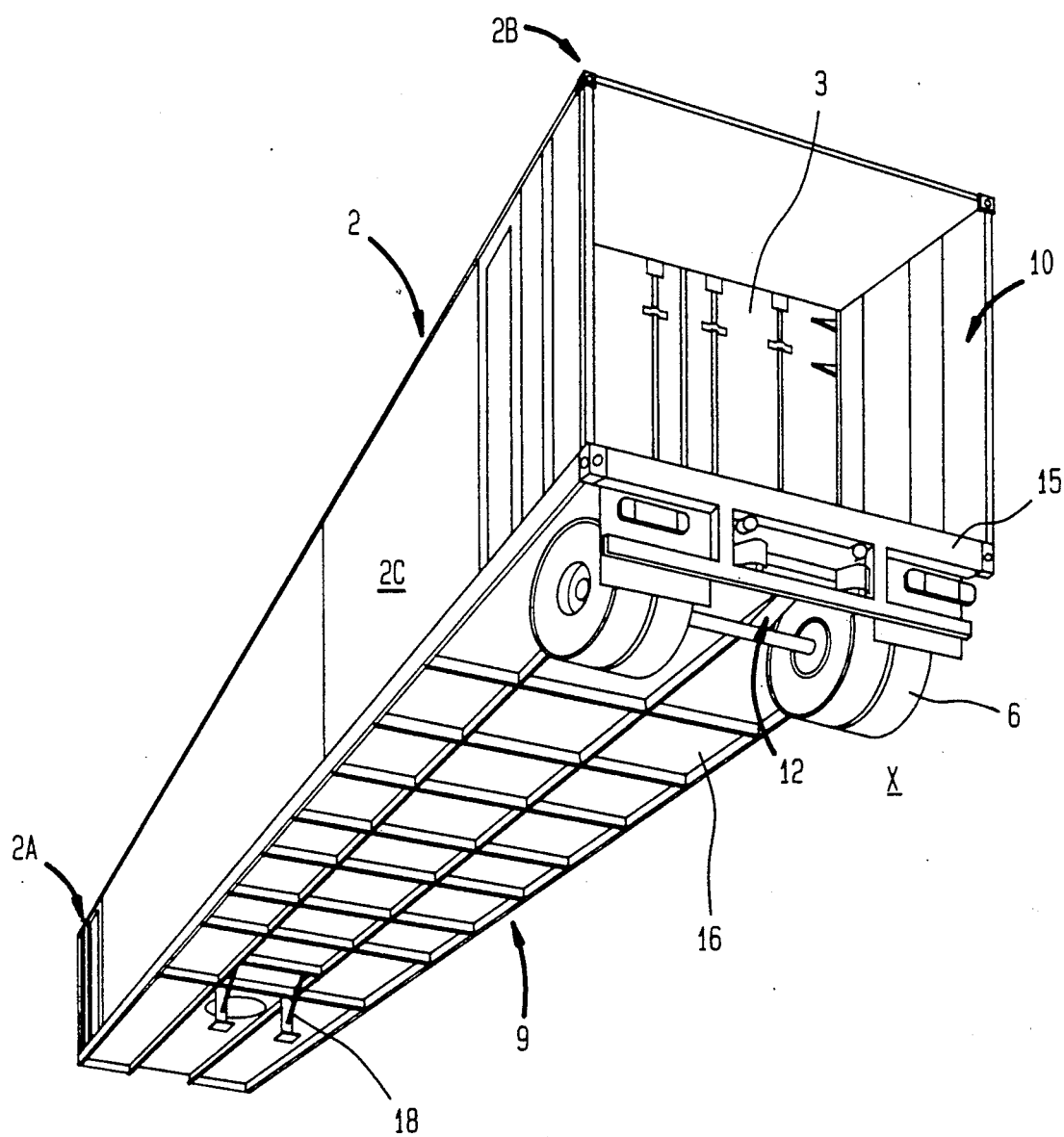
Figure 14:
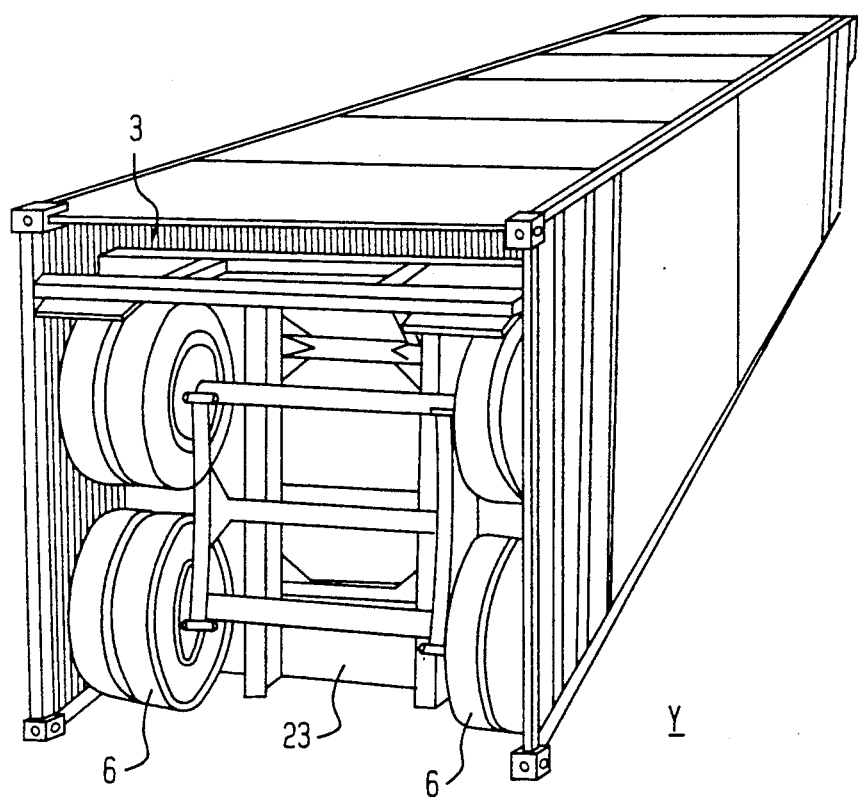
Figure 15:
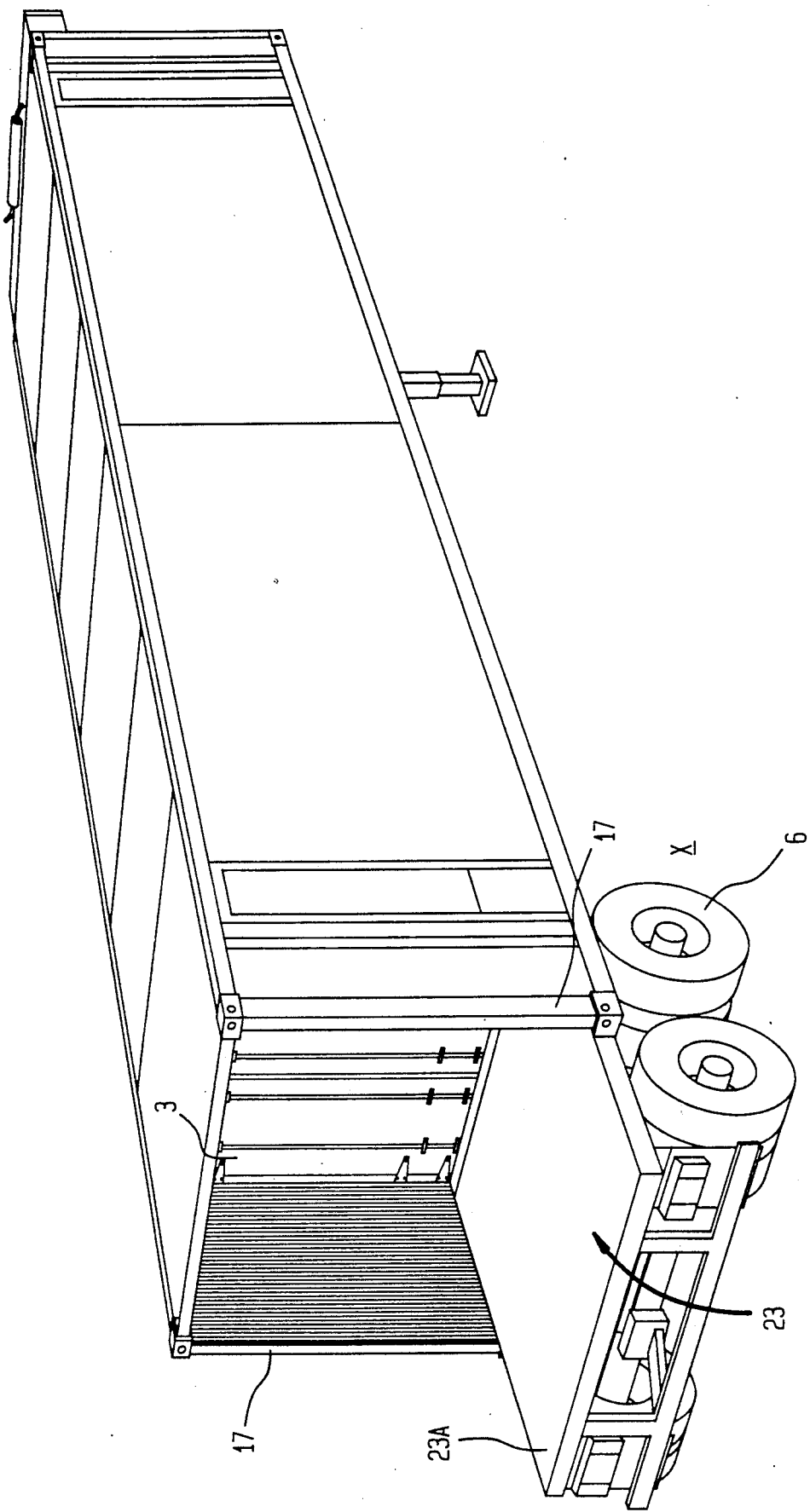

FIGS. $7^1$ and $7^2$ are partial side views of the rear portion of a cargo holder in accordance with two further embodiments of the present invention;

FIG. 8 is an enlarged partial bottom plan view of the cargo holder of FIG. 3;

FIG. 9 is a partial side view of the rear portion of a cargo holder in accordance with yet another embodiment of the present invention;

FIG. $9^1$ is a partial side view of the rear portion of a cargo holder in accordance with still another embodiment of the present invention;

FIG. 10 is a rear perspective view of the cargo holder of FIG. 3 shown with the wheels raised;

FIG. 11 is a rear perspective view of the cargo holder shown in FIG. 10 with the wheels arranged in the lowered position;

FIG. 12 is a front, bottom perspective view of a cargo holder in accordance with the present invention;

FIG. 13 is a rear, bottom perspective view of a cargo holder of the present invention;

FIG. 14 is a rear perspective view of a cargo holder comprising a bogie with double wheel axles arranged in a raised position; and FIG. 15 is a rear perspective view of the cargo holder shown in FIG. 14 with the double wheel axles arranged in a lowered position.

DETAILED DESCRIPTION OF THE PREFERRED EMBODIMENTS

Figure 4:
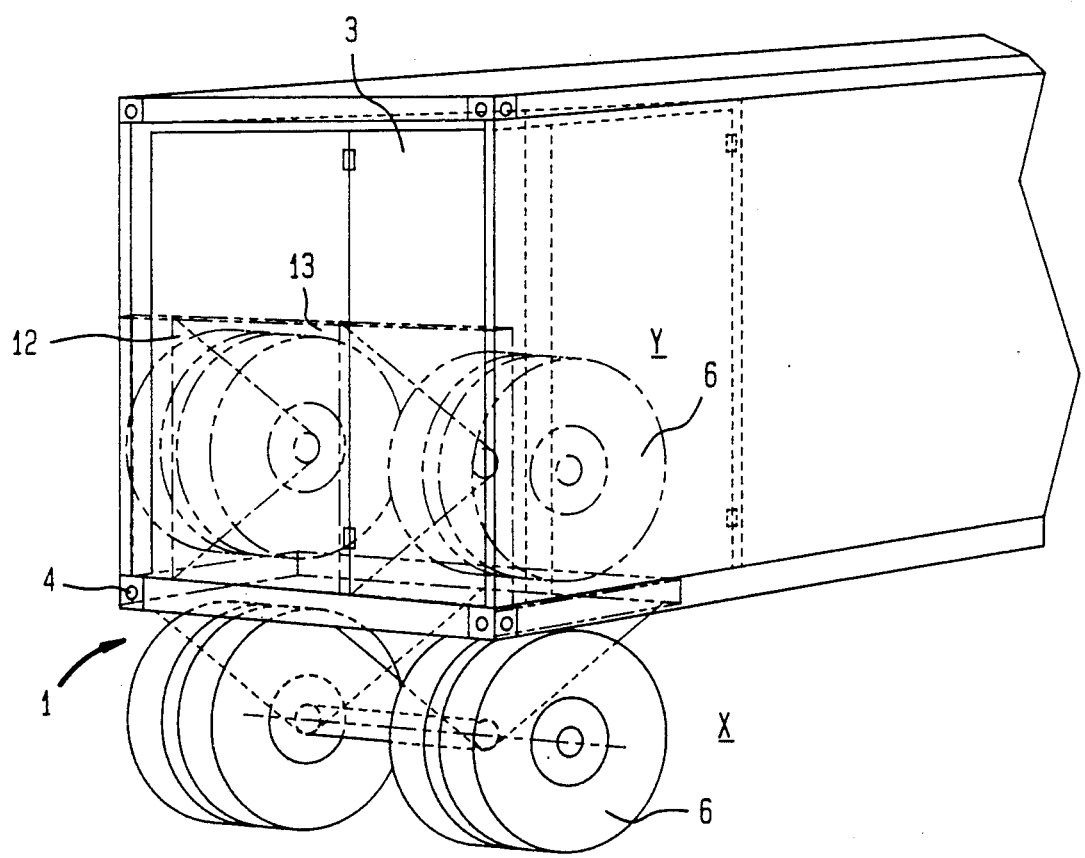
FIG. 4 is an enlarged perspective view showing the detail of the rear end of the cargo holder of FIG. 3.
Figure 7:
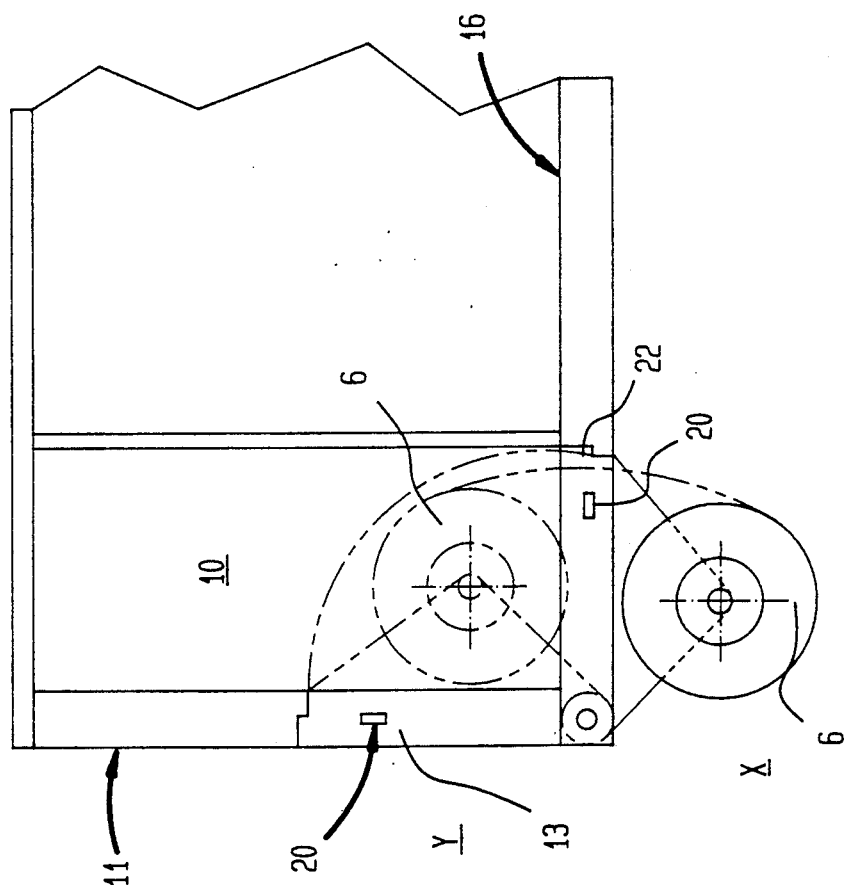
FIG. 7 is a partial diagrammatic side view of the rear portion of the cargo holder of FIG. 3.

Referring to FIG. 3, there is shown a cargo holder 2 of the container type which is typically formed from metal in a rectangular shape. Cargo holder 2 consists of those elements which are found in conventional containers, including, for example, pivotally mounted doors 3 located at the rear of the container; attachment holes 4 for receiving lifting equipment, fixing elements and locking elements; and side pockets 5 for receiving the forks of fork lift trucks. Cargo holders 2 are designed so they can be stacked with one cargo holder on top of another, for example on board ships, etc. during transport. In addition, cargo holders 2 are specifically designed, inter alia, to be transported to the intended destination over land on their own wheels 6 after being unloaded from a ship. The wheels 6, which can be conventional air-filled rubber wheels and supported by one or more axles spring-mounted in a known fashion, are designed so that they can be moved between a storage position Y above the bottom extreme 7 of the cargo holder and a driving position X below the bottom extreme 7 of the cargo holder, as shown in FIG. 4. Moreover, the wheels 6 are designed so as to be movable between the positions X and Y in connection with the loading and unloading of the cargo holder 2 onto or off from a ship. In addition, a coupling 8, which permits cargo holder 2 to be releasably connected to a haulage vehicle, is arranged on the underside 9 of the cargo holder 2 in the area of the front section 2A.

As shown in FIGS. 5 and 10, the wheels 6 are arranged in the rear section 2B of the cargo holder 2 so that they can be received in a tunnel-like passage 10, formed as a wheel reception space, between the doors 3 located at the rear of the cargo holder and a rear loading opening 11. The wheels 6, in combination with associated spring elements 12 and support part 13, are pivotally mounted about a suitable support axle 14 which, as shown in FIGS. 5 and 6, is located on the lower cross bar 15 extending across the container 2 in the rear portion 2B thereof. When the entire wheel assembly, including the support part 13, spring elements 12 and wheels 6, is lowered to an essentially horizontal position X, the support part 13 forms an extended floor section of the cargo space 2C of the container which is located at the same level as the floor 16. On the other hand, when raised to an essentially vertical position Y, the wheel assembly forms a rear wall section of the container 2 which extends between the rear vertical frame members 17 of the container.

The container 2 is provided with all the equipment which is required for overland transport and shipping in the respective countries in which the invention is intended to be used. Thus, for instance, a number of lights, mud flaps, rear bumpers, registration plates, etc., none of which are shown in the figures, may be mounted on the support part or wheel frame 13. The support part or wheel frame 13 also includes any necessary brakes and/or shock absorbers which are also not shown.

Referring to FIG. 3, a pivotally mounted stand support 18 is arranged at a distance from the wheels 6 for supporting the front end 2A of the container 2 when the container is standing on a base 19 for coupling to a haulage vehicle, etc. The stand support 18 is expediently designed in a well-known manner so as to lower automatically when the container 2 is to be set up for haulage.

The wheels 6 are designed to automatically lower, either by their own weight or through some other mechanism, when the container 2 is lifted up by crane or fork lift truck, and are locked in the intended position Y or X by a locking arrangement 20 of a type generally known in the art. Locking arrangement 20 may be connected to the rear vertical frame members 17 or horizontal frame members 21 of the container for the purpose of preventing the wheels 6 from rising when the container 2 is placed on the ground 19. A knob 22 or other limiting device may be arranged on the container in order to prevent the wheels from swinging past their intended driving position X at which they are locked in place.

When the wheels 6 are to be raised, the container 2 is lifted slightly so that the locking arrangement 20 may be released. Thereafter, the container 2 is lowered onto a base such as, for example, the top part of a similar container, in which position, due to the weight of the container 2, the wheels 6 automatically swing into the space 10. Once swung into the storage position Y, the wheels 6 are locked in place by locking arrangement 20. Although, as described above, the wheels 6 and the stand support 18 are typically maneuvered manually, these elements may be maneuvered in a known manner by electrical, hydraulic, or pneumatic means, or by a combination thereof.

The chassis for hauling the container on land is integral with the container and therefore firmly connected to the container at all times. Accordingly, after unloading the container 2 from the ship there is no need to attach a separately detachable chassis to the container for transporting same over land.

FIG. $7^1$ shows a variant of the single axle arrangement in which the wheels 6 are supported by a plate $13^1$ which is mounted on the lower frame members 21 of the container in the area directly behind the doors $3^1$, so that the wheels can pivot essentially 90° between the two locked positions X and Y.

FIG. $7^2$ shows a further variant of a single axle arrangement in which the wheels 6 are mounted on a support part $13^2$ which, in turn, is pivotally mounted to a hinge $14^2$ located in a central area of support part $13^2$ so that the wheels 6 can be turned essentially 180° around the hinge $14^2$ between the locked positions X and Y.

Referring to FIG. 9, a wheel bogie arrangement with double axles is shown in which the wheels 6 are mounted in the same way as in the case of wheel undercarriages having a single axle, i.e. supported by a plate 13A which is pivotally mounted about a pivot hinge 14A located at the rear end of the container 2. The wheel bogie arrangement may be pivoted and locked in a similar fashion and in corresponding positions X and Y as described above in connection with the single axle embodiment. The only essential difference is in the size of the two different spaces 10 and 10A, i.e. the wheel reception space 10A in the double axle bogie embodiment is larger than the wheel reception space 10 in the single axle embodiment. As a result, the cargo storage space inside rear doors 3 is smaller in the double axle embodiment than in the single axle embodiment.

Finally, FIGS. $9^1$, 14 and 15 show a variant of the present invention having a bogie with double wheel axles in which the wheels 6 are supported by a plate 23 which is pivotally mounted about a support axle 14B located behind the doors 3 of the container 2. In the raised position Y, the plate 23 and the wheels 6 are received in a space formed outside the doors 3, while in the lowered position X, the plate 23 forms an extension of the cargo floor of the container in the same manner as in the previously described embodiments. In this case, however, a section 23A of the plate 23 projects beyond the rear vertical uprights 17 of the container 2. Again, the entire wheel assembly may be locked in either the vertical position Y or horizontal position X by means of a suitable locking arrangement 20.

The present invention may be simply adapted for use with already existing container-type cargo holders merely be lengthening same slightly when incorporated on newly constructed container-type cargo holders, however, the loading capacity of the container may be maintained without changing the length or breadth of the containers by increasing the height thereof.

In accordance with the present invention, containers do not have to remain standing in ports after unloading, but may be driven away immediately. Moreover, the containers may be easily moved within the port area when required without having to resort to heavy lifting equipment.

The containers 2 of the present invention have a strength which is substantially similar to that of conventional containers. Therefore, there is no more risk of damage to the container or the contents of its cargo than there is in conventional containers. For this reason, the containers of the present invention are just as reliable as conventional containers.

In accordance with the present invention, a transport system is achieved which not only performs well, but in which the weight of the transport containers is considerably lower than that of the conventional combination of a cargo holder and chassis. This results, inter alia, in improved economy in connection with the overland transport of the containers.

The present invention is particularly suitable for advantageous adaption to refrigerated and/or freezer containers in which it is particularly important that the containers reach their intended destination quickly so that the contents thereof do not spoil as a result of long freight and/or storage periods. Finally, it should be mentioned that the containers 2 are easily to identify since they carry registration plates, and for that reason the risk of loosing the containers is minimized.

Although the invention herein has been described with reference to particular embodiments, it is to be understood that these embodiments are merely illustrative of the principals and applications of the present invention. It is therefore to be understood that numerous modifications may be made to the illustrative embodiments and that other arrangements may be devised without departing from the spirit and scope of the present invention as set forth in the appended claims.

I claim:

1. A stackable cargo holder for transporting cargo comprising,
   a container defining a storage space and having a front end, a rear end and a bottom;
   a wheel assembly arranged proximate to said rear end of said container and movably connected thereto for displacement between a storage position above said bottom of said container whereby said bottom of said container can be stacked in contact with a supporting surface and a use position below said bottom of said container, said wheel assembly including at least two wheels, means interconnected with said container for locking said wheel assembly in said use position, means for retaining said wheel assembly in said storage position,
   means responsive to vertical movement of said container with respect to said supporting surface for displacing said wheel assembly between said storage and use positions, and
   coupling means disposed proximate said front end of said container for releasably connecting said container to a haulage vehicle.

2. The cargo holder as claimed in claim 1 further comprising a wheel reception space arranged proximate said rear end of said container for receiving said wheel assembly in said storage position.

3. The cargo holder as claimed in claim 1 wherein said wheel assembly further comprises a wheel frame which forms an essentially horizontal floor section when displaced to said use position and an essentially vertical wall section when displaced to said storage position.

4. The cargo holder as claimed in claim 3 wherein said horizontal floor section lies substantially coplanar with said bottom of said container.

5. The cargo holder as claimed in claim 1 further comprising a support stand connected proximate to said front end of said container and displaceable between a support position for supporting said front end of said container and a storage position.

6. The cargo holder as claimed in claim 5 wherein said support stand is pivotally displaceable between said support position and said storage position.

7. The cargo holder as claimed in claim 1 wherein said wheel assembly is pivotally displaceable between said storage position and said use position.

8. The cargo holder as claimed in claim 7 wherein said wheel assembly further comprises at least one wheel axle connected between said wheels.

9. The cargo holder as claimed in claim 7 wherein said wheel assembly is pivotally mounted on a cross bar extending across said container.

10. The cargo holder as claimed in claim 7 further comprising a support stand connected proximate to said front end of said container and displaceable between a support position for supporting said front end of said container and a storage position.

11. The cargo holder as claimed in claim 10 wherein said support stand is pivotally displaceable between said support position and said storage position.

12. The cargo holder as claimed in claim 7 wherein said wheel assembly further comprises a wheel frame which forms an essentially horizontal floor section when pivoted to said use position and an essentially vertical wall section when pivoted to said storage position.

13. The cargo holder as claimed in claim 12 wherein said horizontal floor section lies substantially coplanar with said bottom of said container.

14. The cargo holder as claimed in claim 12 further comprising a support stand connected proximate to said front end of said container and displaceable between a support position for supporting said front end of said container and a storage position.

15. The cargo holder as claimed in claim 14 wherein said support stand is pivotally displaceable between said support position and said storage position.

* * * * *

UNITED STATES PATENT AND TRADEMARK OFFICE
CERTIFICATE OF CORRECTION

PATENT NO. : 5,050,897
DATED : September 24, 1991
INVENTOR(S) : Stromberg

It is certified that error appears in the above-identified patent and that said Letters Patent is hereby corrected as shown below:

Column 5, line 8, "slightly when" should read --slightly. When--.

Column 5, line 22, after "cargo" insert --space--.

Signed and Sealed this

Ninth Day of March, 1993

Attest:

STEPHEN G. KUNIN

Attesting Officer

Acting Commissioner of Patents and Trademarks